US007526767B1

(12) United States Patent
Rhee et al.

(10) Patent No.: US 7,526,767 B1
(45) Date of Patent: Apr. 28, 2009

(54) METHODS FOR AUTOMATIC GROUP SWITCHING ACCORDING TO A RESOURCE PLAN

(75) Inventors: Ann Rhee, Foster City, CA (US); Sumanta Chatterjee, Fremont, CA (US); Juan Loaiza, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 542 days.

(21) Appl. No.: 09/967,441

(22) Filed: Sep. 27, 2001

Related U.S. Application Data

(63) Continuation-in-part of application No. 09/141,666, filed on Aug. 28, 1998, now Pat. No. 6,457,008, and a continuation-in-part of application No. 09/141,664, filed on Aug. 28, 1998, now Pat. No. 6,341,303.

(51) Int. Cl.
*G06F 9/46* (2006.01)
(52) U.S. Cl. ...................... 718/104; 718/108
(58) Field of Classification Search ................ 718/100, 718/102, 103, 104, 107, 108, 105, 106
See application file for complete search history.

(56) References Cited

U.S. PATENT DOCUMENTS

| | | | | |
|---|---|---|---|---|
| 3,865,999 | A | | 2/1975 | Spitaels |
| 4,283,711 | A | | 8/1981 | Chang |
| 5,010,482 | A | * | 4/1991 | Keller et al. ................... 710/52 |
| 5,325,525 | A | * | 6/1994 | Shan et al. ................... 718/104 |
| 5,355,475 | A | | 10/1994 | Tanaka et al. |
| 5,367,678 | A | * | 11/1994 | Lee et al. ..................... 718/104 |
| 5,392,430 | A | | 2/1995 | Chen et al. |
| 5,452,452 | A | * | 9/1995 | Gaetner et al. .............. 718/103 |
| 5,515,538 | A | * | 5/1996 | Kleiman ..................... 710/260 |
| 5,566,349 | A | * | 10/1996 | Trout .......................... 710/20 |
| 5,623,647 | A | | 4/1997 | Maitra |
| 5,815,689 | A | * | 9/1998 | Shaw et al. .................. 713/400 |
| 5,828,568 | A | | 10/1998 | Sunakawa et al. |
| 5,842,226 | A | | 11/1998 | Barton et al. |
| 5,884,077 | A | * | 3/1999 | Suzuki ........................ 718/105 |

(Continued)

OTHER PUBLICATIONS

Logan G. Harbaugh, *Balancing The Load*, TechWeb, Jan. 25, 1999, pp. 1-14 internetweek.com/reviews/rev012599.htm.

(Continued)

*Primary Examiner*—Meng-Ai An
*Assistant Examiner*—Camquy Truong
(74) *Attorney, Agent, or Firm*—Vista IP Law Group, LLP

(57) ABSTRACT

A resource scheduler is provided for allocating a computer system resource to database management system (DBMS) processes. The resource scheduler operates according to resource plans and resource allocation methods. Each plan allocates the resource according to a resource allocation method. During operation of the DBMS, any of the active plans and resource allocation method may be exchanged for alternate plans or resource allocation methods. The resource scheduler enforces an emphasis resource allocation method in which processor time is allocated in percentages to groups of database processes groupified according to common execution requirements. A selected plan includes multiple process groups and/or sub-plans. The resource scheduler allocates processor time in multiple levels among the sub-plans and groups of database processes. Database processes are automatically switched between the groups of a plan according to switch criteria.

26 Claims, 11 Drawing Sheets

U.S. PATENT DOCUMENTS

| | | | | |
|---|---|---|---|---|
| 6,003,061 A | * | 12/1999 | Jones et al. | 718/104 |
| 6,021,508 A | | 2/2000 | Schmuck et al. | |
| 6,085,216 A | | 7/2000 | Huberman et al. | |
| 6,085,218 A | * | 7/2000 | Carmon | 718/107 |
| 6,085,333 A | * | 7/2000 | DeKoning et al. | 714/7 |
| 6,105,053 A | | 8/2000 | Kimmel et al. | |
| 6,160,798 A | | 12/2000 | Reed et al. | |
| 6,182,133 B1 | | 1/2001 | Horvitz | |
| 6,223,201 B1 | | 4/2001 | Reznak | |
| 6,223,206 B1 | | 4/2001 | Reznak | |
| 6,226,745 B1 | | 5/2001 | Wiederhold | |
| 6,263,298 B1 | | 7/2001 | Kerman et al. | |
| 6,263,358 B1 | | 7/2001 | Lee et al. | |
| 6,263,359 B1 | | 7/2001 | Fong et al. | |
| 6,341,303 B1 | | 1/2002 | Rhee et al. | |
| 6,353,844 B1 | * | 3/2002 | Bitar et al. | 718/102 |
| 6,366,915 B1 | | 4/2002 | Rubert et al. | |
| 6,366,945 B1 | | 4/2002 | Fong et al. | |
| 6,385,637 B1 | | 5/2002 | Peters et al. | |
| 6,385,638 B1 | * | 5/2002 | Baker-Harvey | 718/107 |
| 6,412,007 B1 | | 6/2002 | Bui et al. | |
| 6,415,190 B1 | * | 7/2002 | Colas et al. | 700/79 |
| 6,415,384 B1 | * | 7/2002 | Dave | 713/100 |
| 6,430,594 B1 | * | 8/2002 | Akiyama et al. | 718/108 |
| 6,430,619 B1 | | 8/2002 | Sitaraman et al. | |
| 6,438,704 B1 | * | 8/2002 | Harris et al. | 713/502 |
| 6,442,608 B1 | | 8/2002 | Knight et al. | |
| 6,463,457 B1 | * | 10/2002 | Armentrout et al. | 709/201 |
| 6,496,848 B1 | | 12/2002 | Nankaku | |
| 6,529,955 B1 | | 3/2003 | Sitaraman et al. | |
| 6,550,042 B1 | | 4/2003 | Dave | |
| 6,563,793 B1 | * | 5/2003 | Golden et al. | 370/236 |
| 6,581,055 B1 | | 6/2003 | Ziauddin et al. | |
| 6,600,963 B1 | | 7/2003 | Loise et al. | |
| 6,601,035 B1 | | 7/2003 | Panagos et al. | |
| 6,643,367 B1 | | 11/2003 | White-Hauser | |
| 6,667,988 B1 | * | 12/2003 | Liu et al. | 370/463 |
| 6,714,960 B1 | * | 3/2004 | Bitar et al. | 718/103 |
| 6,718,332 B1 | | 4/2004 | Sitaraman et al. | |
| 6,728,959 B1 | * | 4/2004 | Merkey | 718/102 |
| 6,775,729 B1 | * | 8/2004 | Matsuo et al. | 710/263 |
| 6,779,182 B1 | * | 8/2004 | Zolnowsky | 718/103 |
| 6,792,445 B1 | | 9/2004 | Jones et al. | |
| 7,017,156 B1 | | 3/2006 | Rhee et al. | |
| 7,020,878 B1 | | 3/2006 | Rhee et al. | |
| 7,024,671 B2 | * | 4/2006 | Yamashita | 718/102 |
| 7,032,222 B1 | * | 4/2006 | Karp et al. | 718/104 |
| 7,054,825 B1 | * | 5/2006 | Hirahara et al. | 705/8 |
| 7,096,469 B1 | * | 8/2006 | Kubala et al. | 718/100 |
| 2002/0019879 A1 | * | 2/2002 | Jasen et al. | 709/240 |
| 2003/0021228 A1 | * | 1/2003 | Nakano et al. | 370/229 |
| 2003/0028852 A1 | | 2/2003 | Thurman et al. | |
| 2003/0120871 A1 | | 6/2003 | Ayaki et al. | |
| 2003/0200252 A1 | | 10/2003 | Krum | |
| 2004/0039935 A1 | | 2/2004 | Pisecky | |
| 2004/0073603 A1 | | 4/2004 | Ellis, III | |
| 2004/0073735 A1 | * | 4/2004 | Boom et al. | 710/260 |
| 2007/0136374 A1 | * | 6/2007 | Guedalia | 707/104.1 |
| 2007/0150898 A1 | * | 6/2007 | Duda et al. | 718/104 |

OTHER PUBLICATIONS

Sitara Networks; QoS Glossary, Jul. 2, 2001, pp. 1-18, sitaranetworks.com/what_is_qos_glossary.cfm.

Zhang, Y. et al. "An Integrated Approach to Parallel Scheduling Using Gang-Scheduling, Backfilling, and Migration" Job Scheduling Strategies for Parallel Processing: 7th International Workshop, JSSPP 2001 Cambridge MA, D.G. Feitelson and L. Rudolph (eds.), Jun. 16, 2001, pp. 133-158, Springer-Verlag Berlin, Heidelberg.

Non-Final Office Action dated Nov. 30, 2004 for U.S. Appl. No. 09/967,459.

Final Office Action dated Jun. 1, 2005 for U.S. Appl. No. 09/967,459.

Non-Final Office Action dated Aug. 8, 2006 for U.S. Appl. No. 09/967,068.

Final Office Action dated Feb. 6, 2007 for U.S. Appl. No. 09/967,068.

Non-Final Office Action dated Aug. 9, 2007 for U.S. Appl. No. 09/967,068.

Non-Final Office Action dated Oct. 4, 2004 for U.S. Appl. No. 09/967,458.

Final Office Action dated Apr. 13, 2005 for U.S. Appl. No. 09/967,458.

* cited by examiner

|  | LEVEL 1 302 | LEVEL 2 304 | LEVEL 3 306 |
|---|---|---|---|
| ON-LINE REQUESTERS 310 | 60% | 50% | 0% |
| BATCH REQUESTERS 312 | 20% | 0% | 100% |
| DBMS MAINTENANCE 314 | 0% | 50% | 0% |

DATABASE PLAN 300

FIG. 3

|  | LEVEL 1 | LEVEL 2 | LEVEL 3 |
|---|---|---|---|
| CLASS 1 | 100% | 0% | 0% |
| CLASS 2 | 0% | 100% | 0% |
| CLASS 3 | 0% | 0% | 100% |

PRIORITY PLAN 400

| Group | Switch |
|---|---|
| OLTP | switch_group=BATCH<br>switch_time=3<br>use_estimate=TRUE |
| BATCH | |

802 — OLTP row
804 — BATCH row
812 — Switch values

FIG. 8

METHODS FOR AUTOMATIC GROUP SWITCHING ACCORDING TO A RESOURCE PLAN

RELATED APPLICATION INFORMATION

This application is continuation-in-part of Ser. No. 09/141,666 now U.S. Pat. No. 6,457,008 filed Aug. 28, 1998, entitled "Pluggable Resource Scheduling Policies" and naming Ann Rhee, Sumanta K. Chatterjee, Juan R. Loaiza and Kesavan Srinivasan as inventors, which application is incorporated herein by reference, in its entirety. This application is a continuation-in-part of Ser. No. 09/141,664 now U.S. Pat. No. 6,341,303 filed Aug. 28, 1998, entitled "Resource Scheduler" and naming Ann Rhee, Sumanta K. Chatterjee, Juan R. Loaiza and Kesavan Srinivasan as inventors, which application is incorporated herein by reference, in its entirety.

BACKGROUND

1. Field of the Invention

The present invention relates to computer operating systems. More specifically, the invention relates to a method of scheduling the use of a computer system resource according to a non-preemptive and dynamically selectable allocation scheme.

2. Related Art

Today's computer systems are relied upon to perform a variety of operations. Performance of the requested operations requires the use of various system resources (e.g., processor, memory, mass storage, network access). The busier the system (i.e., the more users connected to the system and the more processes or jobs running on the system), the greater the demand upon each such resource. Whenever more than one process or user at a time requires one of the computer's resources, the resource must be shared between the requesting entities. Thus, some form of resource allocation and scheduling is needed.

Operating systems, which manage the allocation of a computer's resources, share the usage of each resource among requesting entities in accordance with some pre-set scheme. For example, in a "round-robin" scheme the operating system divides usage of a resource by granting each requesting process full use of the resource for a relatively short period of time, and by rapidly switching use of the resource among all consumers. In an alternative scheme, requesting entities are grouped according to their associated priority. Those processes given relatively high priorities receive larger portions or more frequent use of the shared resource than processes assigned lower priorities.

Each of these schemes has disadvantages. For example, transferring use of a resource among numerous consumers in a round-robin scheme can be inefficient because during the time it takes to effect the transfer (commonly termed a "context switch") the resource is not being productively used. The more frequently the resource is transferred, the less time it is actually in use and the lower its overall efficiency. A priority scheme may somewhat alleviate the waste of resource time inherent in context switches by providing for longer use of the resource in between transfers, but will be unfair to those consumers that must wait longer periods of time to use the resource.

The chosen method of sharing a resource among multiple consumers typically affects all system users, whether they interface directly with the operating system or operate within an application environment (e.g., a database management system (DBMS), a word processor, a modeling system). For example, instead of directly accessing the necessary computer resources to manage access to database tables on behalf of numerous users, a database management system typically calls upon the operating system to handle such access. Users within application environments are thus dependent upon the scheduling scheme implemented by the operating system, which may not provide the most efficient access to resources needed by those users. Because the operating system schedules use of all resources among all consumers according to a set scheme, an environment or process that would benefit from a different scheduling scheme suffers. The operating system's method of allocating resources is not flexible enough, and usually cannot be customized, to provide for the optimal sharing of resources among all consumers.

In a large database management system, for example, which may have thousands of processes and jobs running to accomplish various tasks (e.g., retrieving data, storing data, generating a report), a scheduling scheme that attempts to give each job or process equal execution time by a processor can be particularly inefficient. With so many processes waiting to execute, the processor time wasted due to context switches becomes excessive. Similarly, attempting to control allocation of a processor's execution time among DBMS users and processes according to a priority scheme does not provide very effective control of the processor's time. The priority scheme merely allows one group of users or processes to be assigned a higher priority than another and thus receive faster or longer use of a resource. This scheme does not provide the ability to assign a particular group a set portion of processor execution time, thus preventing a database administrator from enabling the most effective control of resource allocation within the DBMS.

Relying upon the operating system's method of resource allocation means that the allocation scheme for distributing resources within the computer system often cannot be dynamically altered according to the demands of system users and processes. In addition, the operating system is usually separate from application environments such as database management systems and therefore generally cannot know what, if any, inter-relationships exist between individual database users, processes and resources. Thus, the operating system may switch a first database process out of a processor while the process holds (i.e., has reserved or been assigned) a resource needed by a second database process. If the second process needs the resource in order to execute, then it is effectively blocked from executing until the first process relinquishes the resource, which may not occur until after the first process receives additional processor time. This situation is often termed "deadlock." In a priority-based allocation scheme where the first process mentioned above is at a lower priority than the second process, this may be termed "priority inversion."

As mentioned above, neither a priority-based scheduling scheme nor a round-robin scheme allows resources to be shared in a truly efficient manner. High priority processes are merely guaranteed to receive more of a resource than low priority processes. If processes or groups of processes could be accorded a particular percentage of a resource, system administrators would be able to allocate resources with much finer granularity. Further, the scheduling scheme implemented by an operating system is set at the time the operating system is loaded and begins executing. If a system manager or user wishes to implement a different scheduling scheme (whether for all or selected environments and processes), the operating system must be re-initialized or rebooted.

Thus, there is a need in the art for a method of allocating or scheduling resource usage that allows efficient resource sharing with minimal waste of the resource. Such a method will allow greater control over scheduling decisions by a system administrator. In particular, a need exists for a method of allocating resources according to ratios or percentages. A need also exists for a method of dynamically modifying a resource allocation plan without disrupting operation of a computer system or an application environment.

SUMMARY

The present invention provides systems and methods for allocating a computer system resource among a plurality of resource consumers. In accordance with an embodiment of the invention, allocation of the resource is more finely controlled than has previously been possible. Resource consumers in the present embodiment include processes, jobs, and other entities operating within a computer system and requiring use of a system resource. Computer system resources that may be allocated or shared among resource consumers illustratively include a processor, memory, mass storage and communication bandwidth.

In one embodiment of the present invention, a database management system (DBMS) is provided. A resource scheduler within the DBMS allocates a processor's execution time (e.g., "quanta") time among various requesting DBMS processes and jobs that require execution time in order to accomplish DBMS users' desired functions. The resource scheduler in this embodiment of the invention allocates processor time among groups of requesting processes and jobs according to dynamically selectable resource plans (e.g., during operation of the DBMS, the active resource plan can be changed). Resource plans in this embodiment comprise resource allocation method for allocating processor time between separate groups and/or among members of an individual group.

In one embodiment of the invention, resource consumers are grouped into resource consumer groups based on their requirements for the resource, as specified by a database administrator (DBA). For example, in one illustrative plan groups are established for different processing functions (e.g., processing electronic mail or fixing programming errors). In another illustrative plan, resource consumers are grouped according to their mode of execution (e.g., on-line, batch). After constructing resource consumer groups, the DBA combines the groups into one or more resource plans.

In an embodiment, only one plan at a time is active during operation of the DBMS. In an alternate embodiment, multiple resource plans are active at the same time. Each plan can include one or more sub-plans. Each sub-plan includes groups of resource consumers.

In an embodiment, during operation of the DBMS, a group can only be a member of one active plan or sub-plan and is thus allocated system resources only within that plan or sub-plan. In an alternate embodiment, a group can be a member of more than one active plan or sub-plan. Within each plan and sub-plan, system resources are assigned to the participating groups based on a resource allocation method.

In a present embodiment of the invention, an "emphasis" resource allocation method is provided in which processor time is allocated among a plan's groups and sub-plans by percentages. By adjusting the percentages, a DBA is able to increase or decrease the emphasis given to individual groups of resource consumers. In this embodiment, each plan and sub-plan implementing the emphasis method is divided into multiple levels. Up to a maximum of 100% of the processor time available at a given level within a plan is distributed according to the percentages assigned to each group or sub-plan in the level. Thus, if 100% of processor time is allocated in the lowest, first level, groups in succeeding levels are shut out unless, as described below, a group is empty when its request for CPU time is granted.

One or more groups of resource consumers may participate in each level of a plan or sub-plan using the emphasis method, and each group may participate in multiple levels of a plan or sub-plan. Processor time that is not allocated among the groups participating in the first level of a plan (or sub-plan) is available for allocation among the groups participating in subsequent levels. If processor time remains unallocated after being divided among the chosen number of levels, the remainder is recycled. In other words, after the total processor time is allocated among the groups participating in the first level of a plan, any processor time left over is allocated to the groups participating in the second level. Any processor time still remaining after allocation in the second level is carried over to the third level, and so on. Processor time left over after configuring the last level is distributed throughout the plan from the beginning.

During DBMS operation, when processor time is to be granted to a group of resource consumers within a particular level, if no consumers in the group are ready to execute, the processor time that the group would have received is carried over to the succeeding level.

Multiple plans can be configured and stored, and the active plan can be changed at any time while the DBMS is running without restarting the operating system or DBMS. In a present embodiment, a plan or plans may include one resource allocation method for allocating processor time between groups (e.g., emphasis policy) and a separate resource allocation method for allocating processor time among the members of a single group (e.g., round-robin).

When operating conditions change (such as the composition of active DBMS users), a database administrator can activate one or more of the stored plans in place of the currently active plan or plans. For example, the resource scheduler may first operate (e.g., during the business day) according to a plan that partitions processor time among groups of resource consumers according to the emphasis method and a first set of percentages. Later, however (e.g., at night), a different plan may be implemented having the same groups but different percentages. Alternatively, the first resource plan may be changed to another plan in which processor time is allocated according to different groups or a different method. In either event, the change in scheduling plan or resource allocation method can be made without restarting the DBMS.

In another illustrative embodiment, a resource usage criterion is defined which, if met, causes a resource consumer to be automatically switched from a first resource consumer group to a second resource consumer group. In a present embodiment, this resource usage criterion is a maximum execution time. Any resource consumer that is executing for more than the defined maximum execution time is automatically switched from the first resource consumer group to the second resource consumer group.

DESCRIPTION OF THE FIGURES

FIG. 3 depicts an emphasis plan for scheduling resources according to one embodiment of the invention.

FIG. 4 depicts one possible implementation of a priority resource allocation scheme, in accordance with an embodiment of the invention.

FIG. 8 depicts a plan for implementing automatic group switching based upon switch criteria, in accordance with an embodiment of the invention.

DETAILED DESCRIPTION OF THE INVENTION

Figure 1:
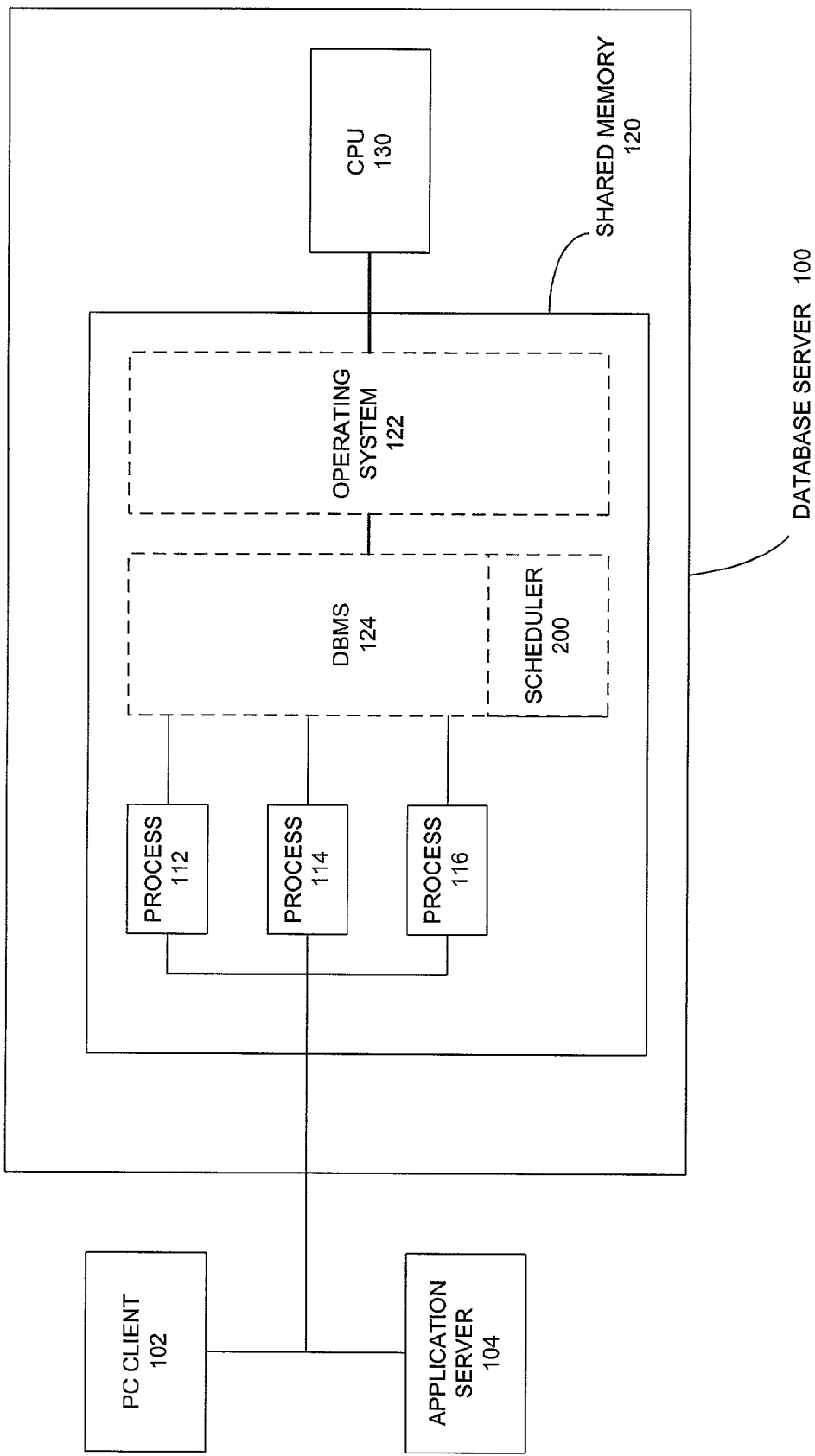
FIG. 1 illustrates a database server on which one embodiment of the invention may be practiced.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. For example, the present invention is described predominantly in terms of a database management system including a scheduler for scheduling or allocating a processor's execution time among a plurality of requesting entities. However, the concepts discussed herein are broad enough to provide for the allocation of any computer system resource among a plurality of entities needing the resource, within or without a particular application environment.

Throughout this detailed description, numerous specific details are set forth. To one skilled in the art, however, it will be understood that the present invention may be practiced without such specific details. In other instances, well-known control structures and system components have not been shown in detail in order not to obscure the present invention.

The present invention is not limited to any one particular implementation technique. Those of ordinary skill in the art will be able to implement the invention with various technologies without undue experimentation once the functionality to be carried out by such components is described. In some instances, components implemented by the present invention are described at an architectural, functional level. Many of the elements may be configured using well-known structures. Additionally, for logic to be included within the system of the present invention, functionality and flow diagrams are described in such a manner that those of ordinary skill in the art will be able to implement the particular methods without undue experimentation. It should also be understood that the techniques of the present invention can be implemented using a variety of technologies. For example, the resource scheduler described herein may be implemented in software running on a computer system, or implemented in hardware utilizing either a combination of microprocessors or other specially designed application specific integrated circuits, programmable logic devices, or various combinations thereof.

Sharing Resources in a Database Management System Environment

In one embodiment of the invention, a database management system (DBMS) is provided for operation on a database server. The DBMS includes a scheduler for allocating processor time among the various users, processes and jobs interacting with the DBMS environment. Processor time is illustratively allocated in periods of time (e.g., "quanta") on the order of 20 milliseconds. The specific duration of allocable processor time is illustratively determined by an operating system executing on the database server independently from the DBMS.

FIG. 1 depicts an illustrative database management system operating on database server 100. DBMS software 124 and operating system 122 are resident in shared memory 120, where they are executed by processor (or CPU) 130. DBMS software 124 includes scheduler 200. In an alternative embodiment, scheduler 200 is separate from DBMS software 124.

In the illustrated embodiment, the DBMS serves one or more clients. Illustratively, client 102 is a small computer system, such as a microcomputer, and client 104 is an application server offering the DBMS services of database server 100 to multiple end users. DBMS processes also reside in memory 120 and operate on behalf of end users, clients, a database administrator (DBA), or another process. Three database processes 112, 114 and 116 are illustrated in FIG. 1. One skilled in the art will recognize that server 100 can be configured to operate a wide range of processes numbering from a few into the thousands and that the scope of the invention is not limited by the number or type of processes executed on server 100.

Database processes executing on server 100 share memory 120, which is coupled to processor 130. In an alternative embodiment, server 100 employs multiple processors. In order to maximize the use of processor 130, one or more DBMS processes that are ready to execute (i.e. are "runnable") are illustratively placed in a run queue (not shown in FIG. 1) within memory 120. When an executing process completes execution or otherwise relinquishes control of the processor, a process within the run queue takes over.

In a present embodiment of the invention, DBMS software 124 is Oracle® RDBMS version 9i by the Oracle Corporation of Redwood Shores, Calif. and operating system 122 is Solaris, by Sun Microsystems, Inc. of Palo Alto, Calif. DBMS software 124 illustratively includes a portion of operating system-dependent code to interface between operating system 122 and DBMS software 124. In such an embodiment, the majority of the instructions included in DBMS software 124 are identical regardless of the brand or version of operating system 122. The operating system-dependent code, however, is tailored to the specific operating system (e.g., Solaris, Unix, Windows NT).

Operating system 122 manages the database server's resources (e.g., disk space, memory, network bandwidth, and processor 130) at a low level, sharing them among all requesting entities. However, a primary function of database server 100 in the present embodiment is to operate DBMS software 124 and serve the DBMS' clients and users. Therefore, the DBMS environment consumes the vast majority of the server's resources, including the execution time of processor 130. Thus, although the operating system manages processor time at a low level, most of the processor time is used within the DBMS where it is partitioned among groups of requesting entities by scheduler 200 as described below. Although in the present embodiment the scheduler simply allocates processor time among consumers (i.e., DBMS users, processes and jobs), in alternative embodiments the scheduler allocates other resources.

Scheduler 200 is highly flexible and employs an allocation, or resource, plan that is dynamically selectable. Multiple resource plans may be configured and stored on the server and one or more plans maybe active at a time. The active plan or plans may be exchanged for other plans during the operation of the DBMS and server. A resource plan partitions processor time among resource consumer groups assembled by a DBA or system manager. Groups and resource plans are further described below, following the description of an illustrative scheduler.

Description of a Database Scheduler

Figure 2:
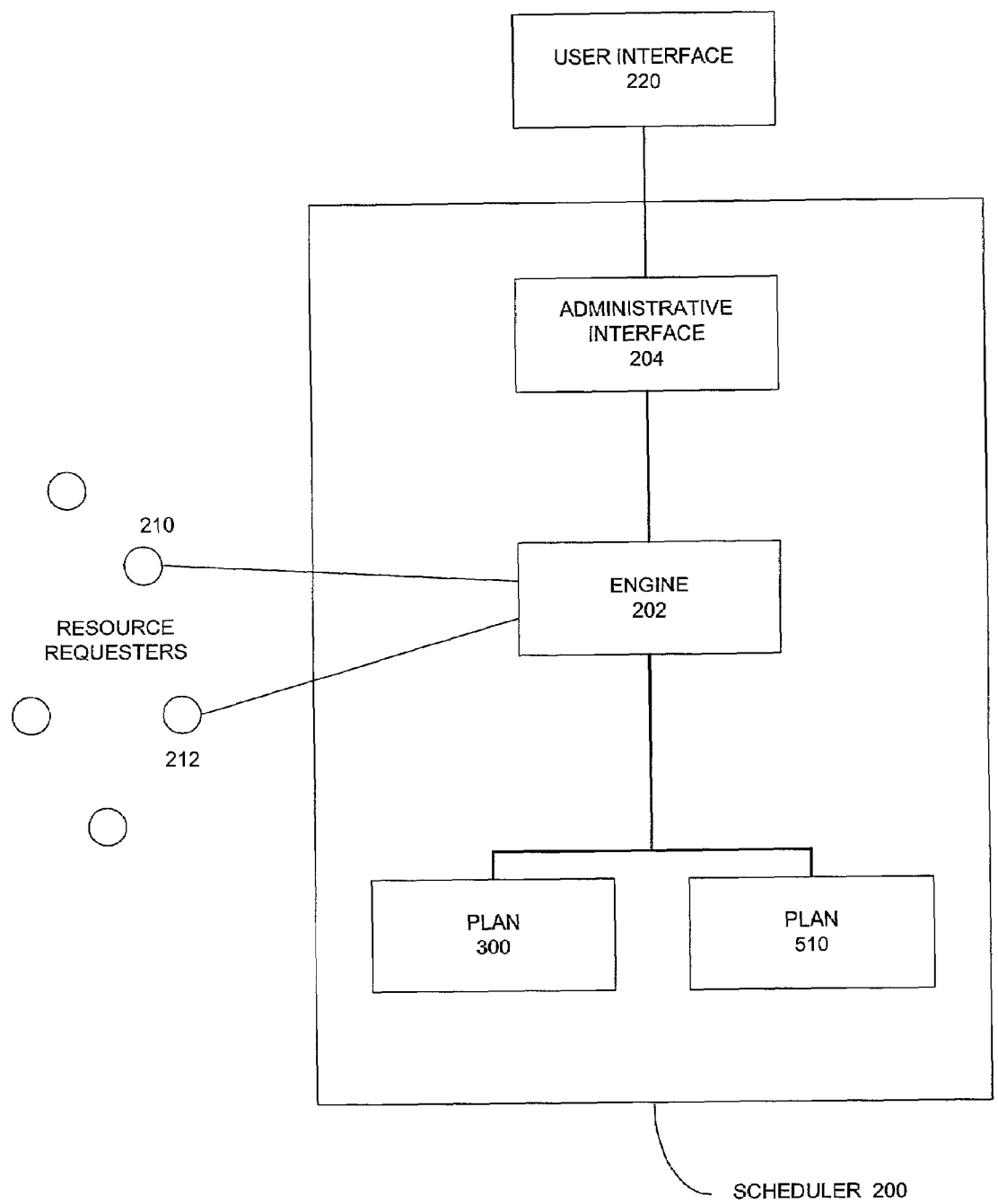
FIG. 2 is a block diagram illustrating a resource scheduler according to one embodiment of the invention.

With reference now to FIG. 2, scheduler 200 is depicted according to one embodiment of the invention. In the illustrated embodiment, the scheduler comprises a portion of DBMS software 124 (from FIG. 1) other than operating system-dependent code. In this embodiment, multi-level scheduler 200 allocates processor time among various entities, herein termed "resource consumers." Resource consumers illustratively include processes and jobs (such as processes 112, 114 and 116 from FIG. 1) needing processor time to execute on behalf of DBMS clients and users. Resource consumers are grouped into "resource consumer groups." In one variation, a database administrator or system manager assigns a resource consumer to a resource consumer group. Scheduler 200 allocates system resources according to a "resource plan", which is a scheme for allocating a resource among a plurality of resource consumer groups and/or sub-plans in accordance with a resource allocation method. A resource plan can contain one or more "resource allocation methods," which are strategies for allocating a resource, and/or one more "sub-plans", which are schemes for allocating a resource among a plurality of resource consumer groups in accordance with a resource allocation method.

Scheduler 200 includes engine 202, administrative interface 204, and one or more resource plans. Two resource plans 300, 510 are depicted in FIG. 2, although one skilled in the art will recognize that the number of plans configured and stored within scheduler 200 does not limit the scope of the present invention. In an embodiment, only one of plans 300, 510 at a time is implemented (i.e., "active") by scheduler 200 during the operation of the DBMS. A DBA may, however, exchange the active plan for a different one even during operation of the DBMS. In an alternate embodiment, multiple plans are active at the same time.

Administrative interface 204 is coupled to user interface 220, which is external to scheduler 200. User interface 220 and administrative interface 204 are employed by a DBA to configure scheduler 200. Through these interfaces, the DBA can configure (e.g., create, modify and delete) a group of resource consumers or select a resource plan for implementation by scheduler 200. The DBA can also modify resource plans, such as to change the groups within a plan or alter a plan's resource allocation method (described below) for allocating processor time.

In a present embodiment, the DBA also employs user interface 220 and administrative interface 204 to observe the performance of scheduler 200. Illustratively, parameters are stored by scheduler 200 concerning its operation, such as statistics reflecting the actual allocation of processor time, the number of entities requesting processor time, the amount of time that resource consumers or resource consumer groups must wait to receive processor time, etc.

Resource consumers communicate with scheduler 200 in order to request and receive processor execution time. Two resource consumers 210, 212 are illustrated in FIG. 2. Illustratively, scheduler 200 keeps a count of the number of consumers that are "runnable," or ready to execute. In accordance with the active resource plan, engine 202 determines which resource consumer group and/or individual consumer is to receive processor time as it becomes available.

The active plan or plans (i.e. the plan or plans implemented by scheduler 200) can be changed during the operation of the DBMS. In other words, engine 202 can quickly switch from implementing plan 300 to implementing plan 510 without interrupting the operation of the DBMS or server 100. Plans are installed at the time the DBMS is initialized and can be removed, modified and added as necessary. As described below, a plan allocates processor time among groups of resource consumers according to an associated resource allocation method and numerical values associated with each group. One plan may be well suited to efficiently meet the needs of certain types of consumers at certain times (e.g., during the business day when most of the consumers comprise processes representing on-line, interactive, users). A different plan, possibly comprising the same groups but having a different resource allocation method or different numerical values attached to the groups, may be more effective than the first at a different time (e.g., at nighttime, when most of the consumers are batch processes).

Resource Plans

The following is a description of an illustrative resource plan depicted in FIG. 3. It will be understood that a wide variety of resource plans may be configured in accordance with the present invention. In general, however, a DBA first assembles resource consumers into groups. Illustratively, group assignments are made based upon the consumer's requirements for processor time (e.g., batch vs. on-line users, administrative and maintenance functions vs. data processing). The DBA then assembles one or more groups into a plan. Within a plan, processor time is allocated to groups of consumers according to numerical values associated with each group in the plan. Multiple plans can include the same groups with different numerical values. In addition, a plan may be included in another plan as a sub-plan.

Within each plan, the DBA specifies an inter-group resource allocation method for partitioning processor time between the groups included in the plan. When a plan is to be implemented by scheduler 200, each group receives processor time according to its associated numerical value and the specified resource allocation method. An intra-group resource allocation method may also be specified for allocating processor time within a group. One advantageous resource allocation method, termed an "emphasis" method, is described immediately below. Other methods are possible, such as round-robin, strict preemption, priority, etc.

In a present embodiment of the invention plan 300 is an "emphasis" plan. In other words, plan 300 allocates processor time between groups of resource consumers according to an "emphasis" method. Specifically, an emphasis plan or method divides processor time according to percentages of available processor time. When the emphasis method is used for inter-group allocation, different groups of resource consumers are given different (or possibly equal) levels of emphasis relative to each other. Intra-group allocation may also use the emphasis method. Thus, in an emphasis plan, individual resource consumers and/or groups of resource consumers are assigned specific percentages of available processor time. In a present embodiment of the invention, processor time is further partitioned in emphasis plans in multiple levels.

With reference now to FIG. 3, DATABASE plan 300 is depicted. DATABASE plan 300, which is an emphasis plan, consists of three levels (Level 1, Level 2 and Level 3), represented by the numerals 302, 304 and 306. On-line (or interactive), batch and DBMS maintenance groups are represented by the numerals 310, 312 and 314.

Within DATABASE plan 300, all processor time available to the DBMS is first allocated in Level 1 according to the percentages associated with each group included in the level. Thus, online and batch consumers receive 60% and 20%, respectively, of the available processor time. The processor time not allocated in Level 1 (i.e., 20% of all available processor time) is allocated among the groups participating in Level 2 according to their assigned percentages. Thus, online consumers and DBMS maintenance tasks each get 50% of the remaining 20% of processor time (i.e., each gets 10% of the total processor time). Finally, if processor time is somehow unallocated after Level 2, it is all allocated to the batch group in Level 3. For example, if a group participating in Level 1 or Level 2 is empty at the time scheduler 200 would have allocated processor time to the empty group, the processor time that would have been allocated to the empty group is given to the batch group in Level 3.

As plan 300 demonstrates, several levels may be configured in a plan. If, after the last level, processor time remains unallocated, it is recursively allocated according to the active plan.

The use of percentages in emphasis plans advantageously allows the allocation of processor time to be more finely-tuned than in a DBMS whose resources are allocated according to a round-robin or priority scheme. For example, a priority scheme would merely allow a DBA to specify that a first set or group of consumers is to receive faster or preemptive access to, or longer use of, processor 130 than a second set or group. The emphasis method, however, allows the DBA to specify particular percentages of processor time for each set or group. Illustratively, a first resource consumer group can be granted a high percentage of the processor's time but a second group can still be assured a certain, lower, percentage of time. Even if a particular resource consumer group becomes heavily populated, other groups (and resource consumers in those groups) participating in the plan will not lose processor time as a result. Individual consumers within the over-populated group may, of course, receive less execution time as a result (depending on the intra-group resource allocation method). The DBA can address group over-crowding in several ways under the present invention. The DBA can, for example, change to a different plan that gives additional emphasis to the over-crowded group or that allocates processor time according to a different method (e.g., round-robin, strict preemption). Alternatively, the DBA can re-configure the group to reduce its population or alter the percentages within the active plan.

When scheduler 200 implements DATABASE plan 300, the actual amount of processor time granted to the various groups is as follows, assuming that each group is adequately populated. On-line users receive 70% of all processor time (60% in Level 1 and 10% in Level 2), batch users receive 20% (Level 1), and DBMS maintenance tasks receive 10% (Level 2). However, if there was no maintenance being performed, on-line users would still receive 70% of the total processing time (from Levels 1 and 2), but batch consumers would then receive the remaining 30% (picking up the additional 10% in Level 3).

One skilled in the art of computer systems will recognize that multi-level plans can be constructed to emulate the priority allocation scheme often used by operating systems. FIG. 4 demonstrates an illustrative priority plan 400. Group 1, Group 2, and Group 3 represent three groups of resource consumers. In each of three levels, one group receives all available processor time. When priority plan 400 is implemented, Group 1 receives all processor time as long as it has at least one member. Only when Group 1 is empty does Group 2 receive processor time. Group 3 receives processor time only when both Groups 1 and 2 are empty.

Figure 5A:
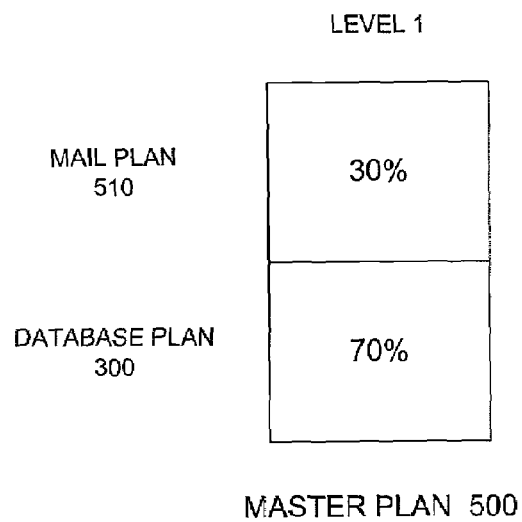
FIGS. 5A-5B depict an emphasis plan having a sub-plan in one embodiment of the invention.
Figure 5B:
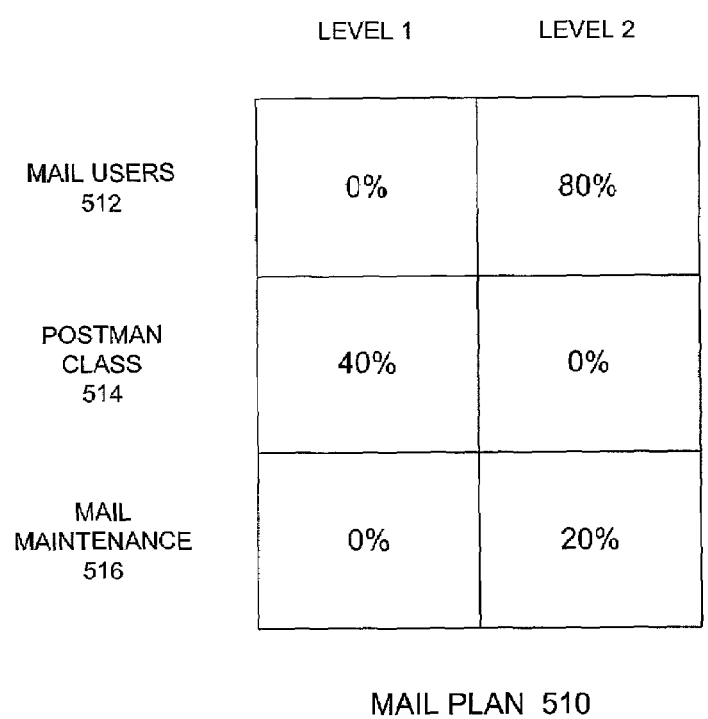

FIGS. 5A and 5B depict a plan having two sub-plans, each of which is an emphasis plan. In FIG. 5A, MASTER plan 500 consists of only one level, in which all processor time is divided between the two sub-plans: MAIL plan 510 and DATABASE plan 300.

MAIL plan 510, depicted in FIG. 5B, consists of 2 levels. In Level 1, the Postman group of resource consumers (represented by the numeral 512) will execute 40% of the time while the mail users and mail maintenance groups (represented by the numerals 514 and 516) share the remaining 60% by a ratio of 80 to 20 in Level 2. DATABASE plan 300 is depicted in FIG. 3.

Figure 6:
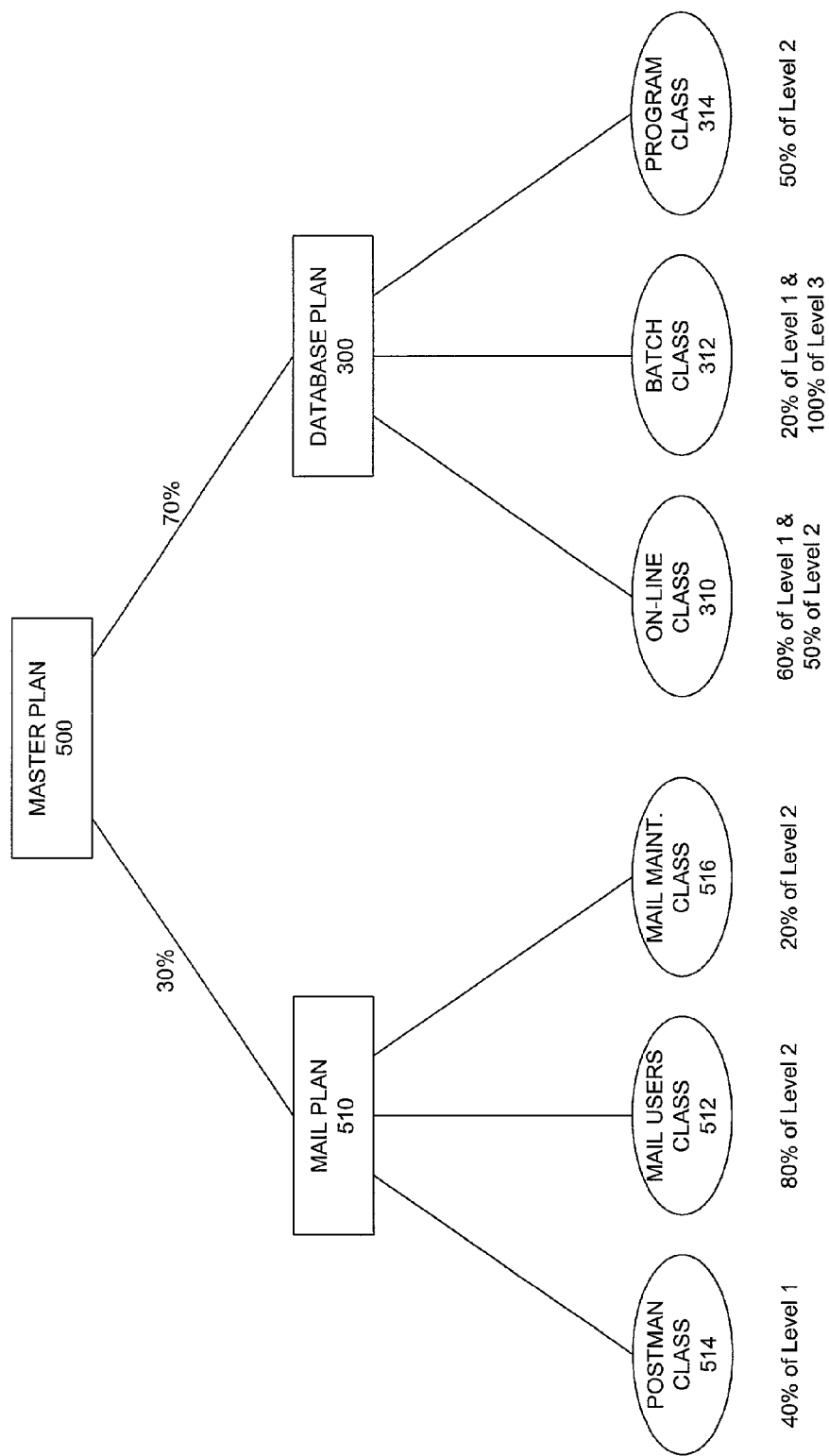
FIG. 6 is a diagram demonstrating the partition of processor time according to the plans of FIGS. 3 and 5A-5B according to an embodiment of the invention.

FIG. 6 is a tree-structured diagram demonstrating the division of processor time according to MASTER plan 500. During the operation of the DBMS, scheduler 200 allocates processor time to the various groups 310, 312, 314, 512, 514, 516 according to their corresponding percentages.

In a present embodiment of the invention, scheduler 200 employs a probabilistic method to choose a consumer to be granted processor time. Illustratively, when multiple resource consumers await use of processor 130, engine 202 (from FIG. 2) calls the active plan (e.g., MASTER plan 500 from FIG. 5). Relying on probabilistic determination to ensure distribution of processor time according to the specified percentages, MASTER plan 500 selects either MAIL sub-plan 510 or DATABASE sub-plan 300. If, for example, MASTER plan 500 selects the MAIL sub-plan, engine 202 then calls MAIL sub-plan 510. MAIL plan 510 then determines (again, in probabilistic fashion), whether to allocate processor time to the Postman group, which is to receive 40% of all processor time distributed in the MAIL plan. If the Postman group is not selected, then there is an 80% chance that the Mail Users group will receive the processor time instead of the Mail Maintenance group.

In an alternative embodiment, instead of having the engine query a plan each time that an allocation decision must be made, the active plan is collapsed so that only one choice must be made. For example, if the Postman group is empty, MASTER plan 500 can select either the Mail Users or Mail Maintenance group immediately upon choosing the MAIL sub-plan. For purposes of this embodiment, a bitmap is maintained to represent which of the established resource consumer groups are populated and which are empty.

In another alternative embodiment, a historical log is kept of the allocation choices made by the active plan (and sub-plans). In this alternative, scheduler 200 can ensure, over time, allocation of processor time according to the planned percentages. Illustratively, each time a choice is made between sub-plans (e.g., in MASTER plan 500), between levels of a plan, or between groups in a level, the choice is made in an attempt to track the planned percentages. In yet a further alternative embodiment, a combination of probability and history is used to make allocation decisions.

Operation of a Multi-Level Scheduler

As stated above, scheduler 200 monitors the need for processor time by resource consumers. To ensure correct allocation of processor 130 among the consumers according to the chosen resource allocation method, scheduler 200 communicates with the consumers, tracks their status, and allocates processor time according to specified inter-group and intra-group resource allocation method.

When a new consumer first requests processor time from scheduler 200, thus indicating it is ready to execute, a "virtual thread" is created and associated with the new consumer's group. Virtual threads thus indicate those consumers that are runnable, or waiting to execute.

In a present embodiment, resource consumers that are ready to execute are either executing or waiting to execute. Only one consumer at a time is executed by each processor in server 100. If waiting to execute (i.e., runnable), a consumer is either awake or asleep. A limited number of runnable consumers is kept awake, the rest are put to sleep.

When one consumer finishes executing, whether because it has completed its task or because it has used its allotted amount of processor time, the next consumer to be executed is taken from the set of awake and runnable consumers. Sleeping consumers, however, cannot be executed until after they are awakened. In one embodiment of the invention, besides any consumers that are executing, only one runnable consumer at a time is kept awake. All others are put to sleep. Thus, in this embodiment, once the executing consumer relinquishes control of the processor, only one consumer is in line to execute and scheduler 200 is thus able to closely control the allocation of processor time among resource consumer groups and individual consumers.

In an alternative embodiment, a number of consumers is kept awake and runnable. Thus, less processor time is wasted in waking and putting consumers to sleep. Consumers are only put to sleep if the number of runnable consumers that are awake is at or above a high threshold value (e.g., three times the number of processors in server 100). Sleeping consumers are only awakened when the number of awake and runnable consumers drops below a low threshold (e.g., the number of processors in server 100).

When an executing consumer relinquishes control of processor 130, the operating system gives control of the processor, in accordance with its own allocation method, to a process that is awake and runnable. If there is only one consumer in such condition, then regardless of which allocation scheme the operating system uses (e.g., round-robin or priority), that consumer will be selected. With multiple processors, scheduler 200 illustratively maintains a separate list of runnable consumers for each processor, although use of a combined list is also within the scope of the invention.

During its execution by processor 130, each consumer periodically communicates with engine 202 to inquire whether it may retain control of the processor. In response, engine 202 either tells it to continue executing or commands the consumer to relinquish control of the processor and sleep. As long as the consumer is allowed to continue execute, it will retain control of the processor and periodically query engine 202.

When the consumer stops executing, operating system 122 gives control to a consumer that is awake and runnable. Thus, in order to maximize the use of each processor, it is preferable to keep at least one consumer awake and runnable for each processor. Therefore, in a present embodiment of the invention in which only one consumer is awake and runnable (but not executing) for each processor, when engine 202 commands the executing consumer to relinquish control of the processor, the engine passes to the relinquishing consumer the identity of a runnable, sleeping consumer that is to be awakened. In other words, instead of the scheduler taking control of the processor just to awaken a sleeping consumer, the consumer that is giving up control of the processor awakens the new consumer before putting itself to sleep. One skilled in the art will recognize that this method of transfer minimizes the loss of usable processor time due to context switching.

Figure 7:
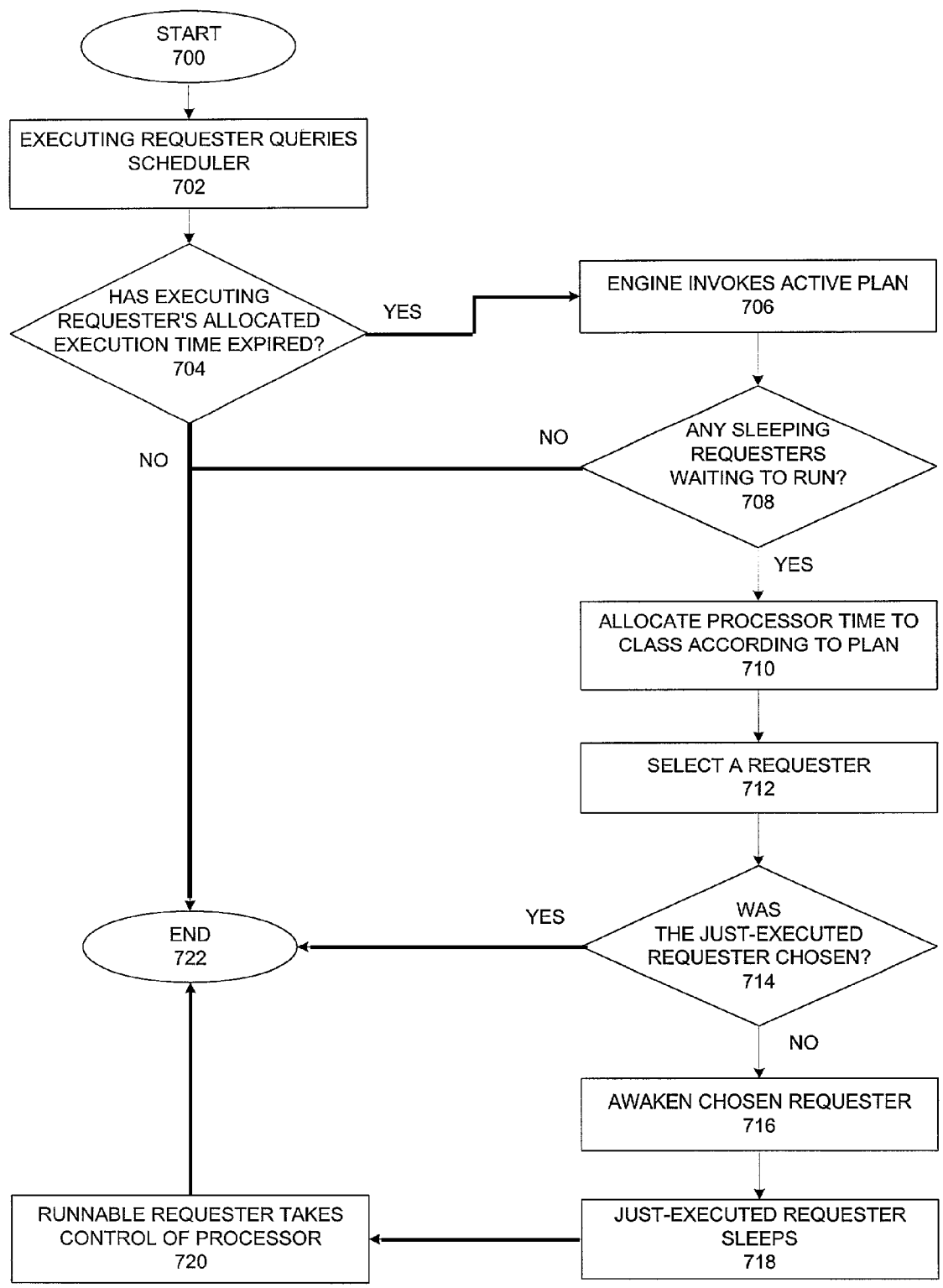
FIG. 7 is a flow chart illustrating a procedure in which resource consumers requiring processor time interact with a resource scheduler to execute in one embodiment of the invention.

FIG. 7 is a flow chart depicting an illustrative method of operating resource scheduler 200 in accordance with an embodiment of the invention. State 700 is a start state. In state 702, scheduler 200 receives a query from resource consumer 210, which is being executed by processor 130, wherein consumer 210 asks whether it should continue executing.

In state 704 the scheduler determines whether consumer 210 has utilized its allocated execution time (e.g., its assigned quanta). If not, consumer 210 continues executing and the illustrated method finishes with end state 722. If, however, consumer 210 has exhausted its allocated execution time, in state 706 the scheduler engine invokes the active plan (e.g., DATABASE plan 300 from FIG. 3) in order to determine which resource consumer group should receive processor time.

In state 708 the scheduler determines whether there are any consumers ready or waiting to execute other than consumer 210. In order to make this determination, scheduler 200 maintains a list of virtual threads representing runnable consumers, as described above.

If there are fewer runnable consumers, including consumer 210, than there are processors, then no consumers are waiting for processor time and there is no need to stop executing consumer 210. In such a case, consumer 210 continues to execute and the system proceeds to state 722, an end state. The system also proceeds to state 722 from state 708 if there are no sleeping runnable consumers. This situation arises when there are relatively few consumers awaiting processor time (e.g., the number of awake and runnable consumers is within the allowable range described above).

If, however, a sleeping consumer must be awakened (e.g., the number of awake and runnable consumers has fallen below the low threshold described above), then scheduler 200 must allocate processor time among the groups of consumers that are waiting for processor time. The system thus proceeds to state 710.

In state 710, a group is chosen in accordance with the inter-group allocation method in effect for DATABASE plan 300 (i.e., the emphasis method described above). In addition, a specific consumer (e.g., consumer 212) is chosen according to the intra-group resource allocation method (e.g., round-robin) associated with the chosen group. In the presently described embodiment of the invention, a probabilistic function is applied to determine which group should receive processor time. In an alternative embodiment, a history is kept to track each consumer (and its group) that is executed in order to verify application of the active plan's specified percentages. For purposes of the illustrated embodiment, the chosen group (i.e., the group that includes consumer 212) is a different group from that which includes consumer 210 (the executing consumer). If the group including consumer 210 is chosen, scheduler 200 illustratively incorporates a bias toward minimizing context switches and thus tends to allow consumer 210 to continue executing and avoid the overhead involved in waking another consumer (unless such bias becomes too unfair to other consumers within the group).

In state 712, an individual consumer (e.g., consumer 212) is selected from within the chosen group and is identified to consumer 210 (the consumer that is to relinquish control of a processor).

In state 714 it is determined whether the selected consumer is the same consumer as that which is finishing execution (i.e., consumer 210). If so, consumer 210 receives an additional quantum and continues executing and the method ends with end state 722. As long as the selected consumer (e.g., consumer 212) is not the same as the one that finished its quanta, the method continues with state 716.

In state 716, consumer 210 awakens consumer 212. Consumer 210 then puts itself to sleep in state 718 to await its next opportunity to execute. In state 720 the operating system recognizes that processor 130 is idle and selects an executable process from those that are runnable. The system then proceeds to state 722, an end state.

Automatic Resource Consumer Group Switching

In another illustrative embodiment, a resource usage criterion is defined which, if met, causes a resource consumer to be automatically switched from a first requestor resource consumer group to a second resource consumer group. In a present embodiment, this resource usage criterion is a maximum execution time. Any resource consumer that is executing for more than the defined maximum execution time is automatically switched from the first resource consumer group to the second resource consumer group. Other usage criteria also include measurements such as storage space usage, number of I/O requests made, or any other measurable metric within a computer system.

In this example embodiment, when a resource consumer is created and a unit of work begins execution on the processor, it is not known beforehand what type of transaction (online or batch) it is. It is sometimes not feasible to group types of transactions beforehand, since there may be thousands of different types of transactions. Referring to FIG. 8, the resource plan 800 is well-suited for such a scenario. The switch criteria 812 allow the DBA to specify under which criteria a resource consumer will be switched to another resource consumer group. In the example of FIG. 8, an OLTP resource consumer that is active for three seconds (switch time) will be switched to the batch resource consumer 804. Since the user estimate criterion is set to TRUE, the resource consumer will be switched based upon an estimate of the resource consumer's execution time. In an alternative embodiment, actual execution times are used. Once the switched resource consumer becomes inactive, as discussed above, it is switched back to the OLTP group 802. Using this mechanism, the DBA can initially assign all resource consumers to the OLTP group 802. Only when a resource consumer runs past a DBA-specified limit will the resource consumer be switched, and hence re-grouped as a batch resource consumer.

In some embodiments, where a resource consumer group has more than one plan directive referring to it, the resource consumer group may have more than one switch group criterion, more than one switch time criterion, or more than one use_estimate criterion. In these cases, the scheduler selects one value to use. For example, the scheduler chooses the most restrictive of all values. Thus, the switch time criterion used is the minimum of all switch time criteria from the plan directives referring to the resource consumer group. Selecting the minimum switch time causes the corresponding switch group criterion to be selected. Similarly, a use_estimate criterion of TRUE overrides a use_criterion of FALSE.

Figure 9:
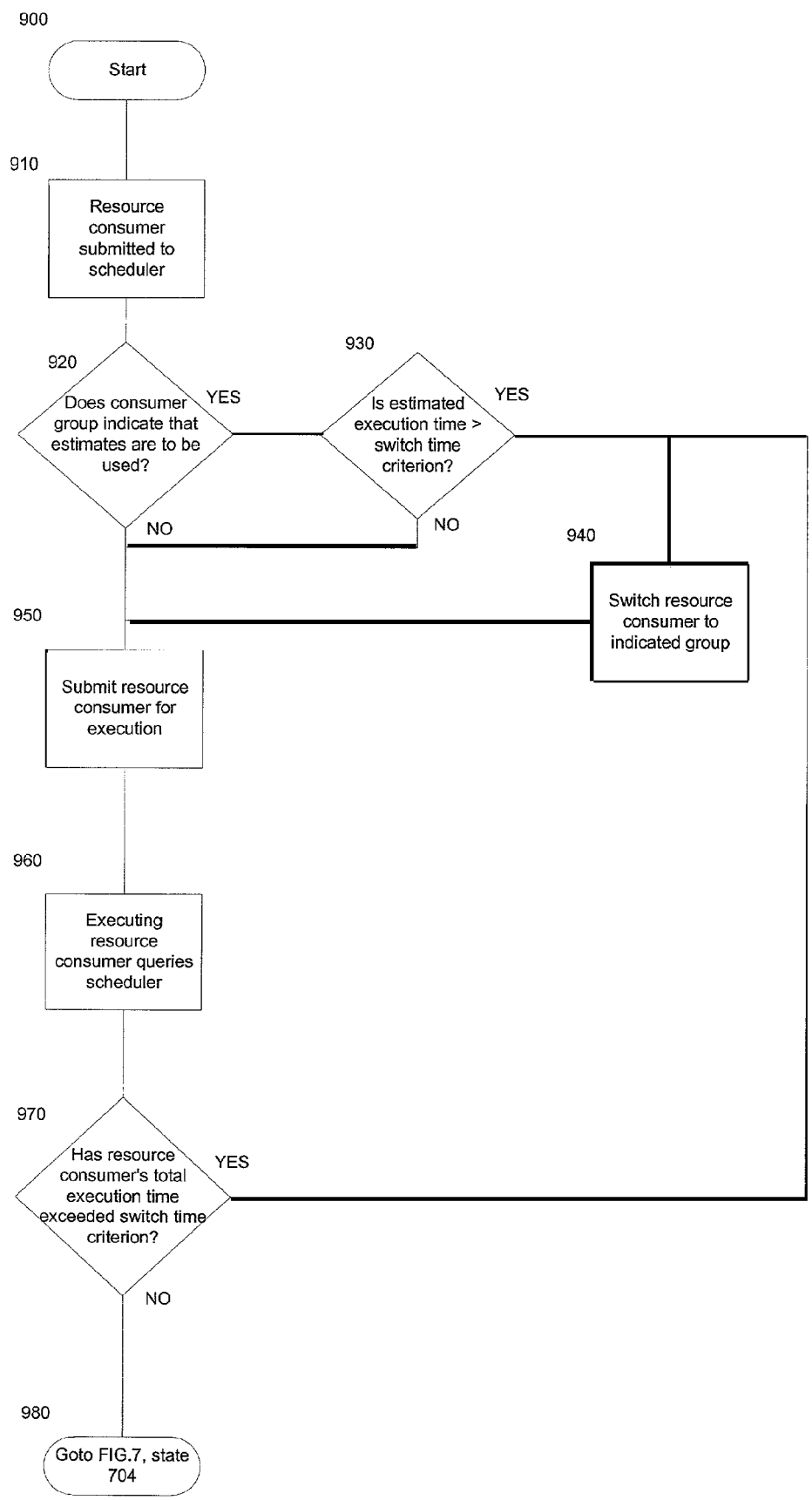
FIG. 9 is a flow chart illustrating a procedure in which resource consumers are automatically switched between resource consumer groups in accordance with an embodiment of the invention.

Referring to FIG. 9, a resource consumer initiates an operation and is submitted to the scheduler 200, in state 910. In state 920, the scheduler 200 checks the plan 800, to see if the plan specifies that automatic group switching should be done based upon an estimated query execution time. If the plan 800 specifies a use_estimate of TRUE, then in state 930 the estimated execution time is computed for the resource consumer, and this estimated execution time is compared with the switch time criterion. If the estimated execution time is greater than the switch time criterion, then the resource consumer is switched into the resource consumer group indicated by the switch group criterion, in state 940. The resource consumer group is then submitted to the processor 130 for execution, in the switched-to resource consumer group, in state 950. If the estimated execution time is not greater that the switch time criterion, then the resource consumer group is submitted to the processor 130, for execution in the original resource consumer group, in state 950.

In state 960, when the resource consumer is being executed by the processor 130, the scheduler 200 receives a query from the resource consumer, asking whether the resource consumer should continue executing. The scheduler compares the total execution time of the resource consumer with the switch time criterion specified in the plan 800, in state 970. If the total execution time exceeds the switch time criterion, then the resource consumer is switched to the resource consumer group indicated by the switch_group criterion of the plan 800, in state 940. If the total execution time does not exceed the switch time criterion, then the resource consumer is further processed according to the method of FIG. 7, in state 980.

In an embodiment where an estimated maximum execution time is used, the estimated maximum execution time can be computed by calculating an estimated execution time for each component of the resource consumer, factoring in any necessary platform-specific information, such as the length of a clock cycle, or the time an I/O request takes, and adding the component values together.

System Architecture Overview

Figure 10:
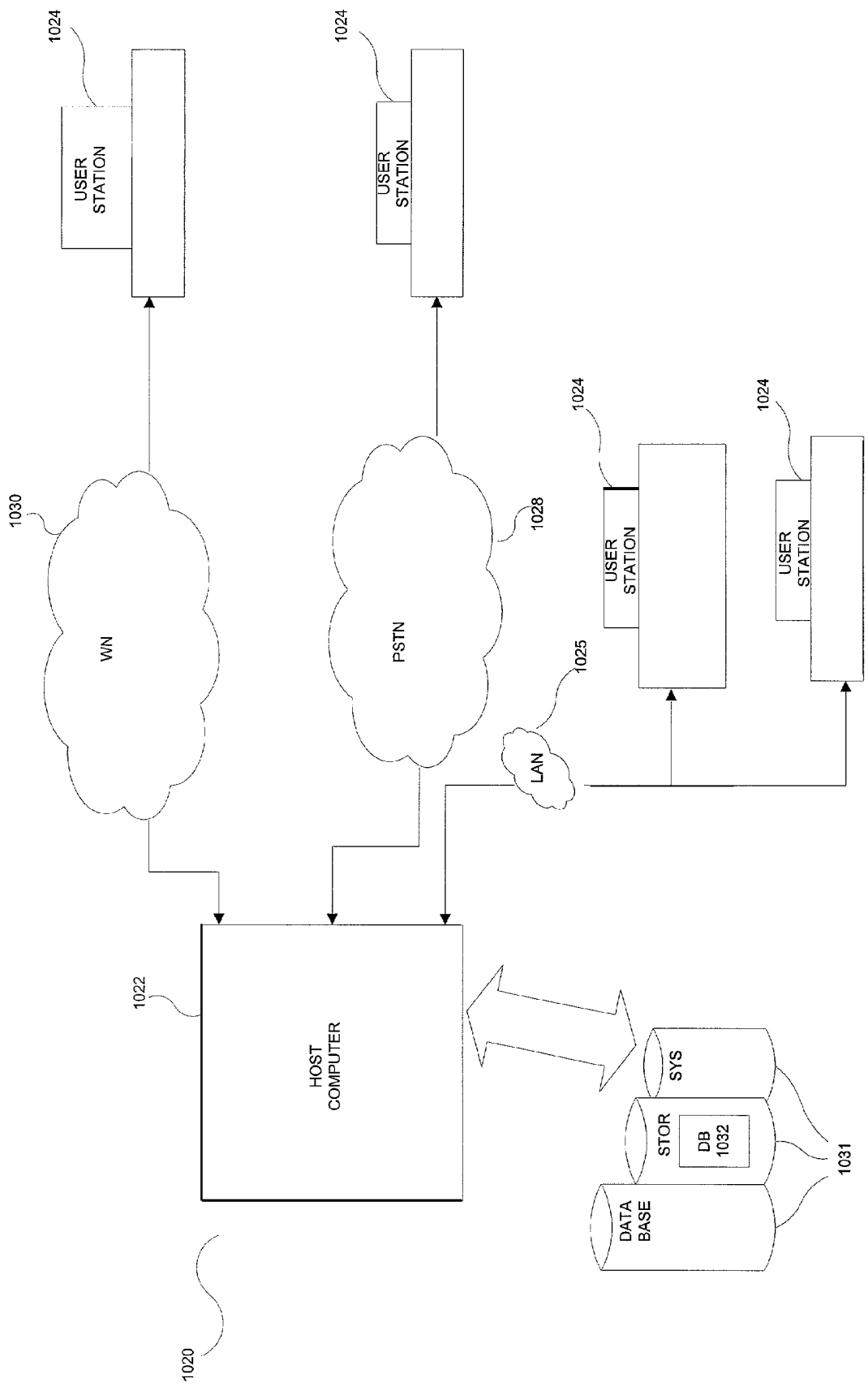
FIG. 10 is a representation of a computer system in accordance with an embodiment of the invention.

Referring to FIG. 10, in an embodiment, a computer system 1020 includes a host computer 1022 connected to a plurality of individual user stations 1024. In an embodiment, the user stations 1024 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 1024 are connected to the host computer 1022 via a local area network ("LAN") 1025. Other user stations 1024 are remotely connected to the host computer 1022 via a public telephone switched network ("PSTN") 1028 and/or a wireless network 1030.

In an embodiment, the host computer 1022 operates in conjunction with a data storage system 1031, wherein the data storage system 1031 contains a database 1032 that is readily accessible by the host computer 1022.

In alternative embodiments, the database 1032 may be resident on the host computer, stored, e.g., in the host computer's ROM, PROM, EPROM, or any other memory chip, and/or its hard disk. In yet alternative embodiments, the database 1032 may be read by the host computer 1022 from one or more floppy disks, flexible disks, magnetic tapes, any other magnetic medium, CD-ROMs, any other optical medium, punchcards, papertape, or any other physical medium with patterns of holes, or any other medium from which a computer can read.

In an alternative embodiment, the host computer 1022 can access two or more databases 1032, stored in a variety of mediums, as previously discussed.

Figure 11:
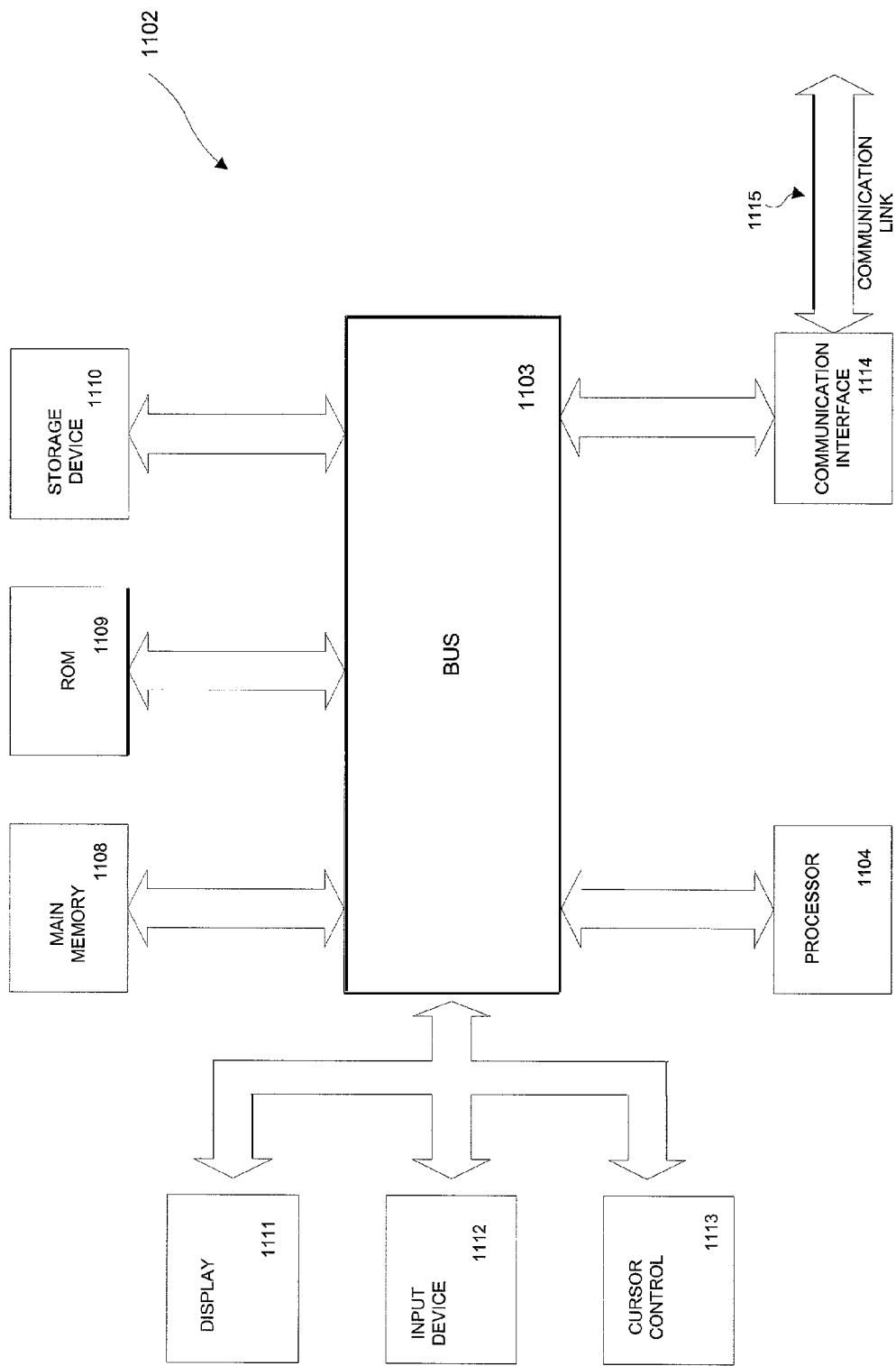
FIG. 11 is a representation of a processing unit in accordance with an embodiment of the invention.

Referring to FIG. 11, in an embodiment, each user station 1024 and the host computer 1022, each referred to generally as a processing unit, embodies a general architecture 1102. A processing unit includes a bus 1103 or other communication mechanism for communicating instructions, messages and data, collectively, information, and one or more processors 1104 coupled with the bus 1103 for processing information. A processing unit also includes a main memory 1108, such as a random access memory (RAM) or other dynamic storage device, coupled to the bus 1103 for storing dynamic data and instructions to be executed by the processor(s) 1104. The main memory 1108 also may be used for storing temporary data, i.e., variables, or other intermediate information during execution of instructions by the processor(s) 1104.

A processing unit may further include a read only memory (ROM) 1109 or other static storage device coupled to the bus 1103 for storing static data and instructions for the processor (s) 1104. A storage device 1110, such as a magnetic disk or optical disk, may also be provided and coupled to the bus 1103 for storing data and instructions for the processor(s) 1104.

A processing unit may be coupled via the bus 1103 to a display device 1111, such as, but not limited to, a cathode ray tube (CRT), for displaying information to a user. An input device 1112, including alphanumeric and other keys, is coupled to the bus 1103 for communicating information and command selections to the processor(s) 1104. Another type of user input device may include a cursor control 1113, such as, but not limited to, a mouse, a trackball, a fingerpad, or cursor direction keys, for communicating direction information and command selections to the processor(s) 1104 and for controlling cursor movement on the display 1111.

According to one embodiment of the invention, the individual processing units perform specific operations by their respective processor(s) 1104 executing one or more sequences of one or more instructions contained in the main memory 1108. Such instructions may be read into the main memory 1108 from another computer-usable medium, such as the ROM 1109 or the storage device 1110. Execution of the sequences of instructions contained in the main memory 1108 causes the processor(s) 1104 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1104. Such a medium may take many forms, including, but not limited to, non-volatile, volatile and transmission media. Non-volatile media, i.e., media that can retain information in the absence of power, includes the ROM 1109. Volatile media, i.e., media that can not retain information in the absence of power, includes the main memory 1108. Transmission media includes coaxial cables, copper wire and fiber optics, including the wires that comprise the bus 1103. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 1104 can retrieve information.

Various forms of computer-usable media may be involved in providing one or more sequences of one or more instructions to the processor(s) 1104 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 1103 may receive the infrared signals and place the instructions therein on the bus 1103. The bus 1103 may carry the instructions to the main memory 1108, from which the processor(s) 1104 thereafter retrieves and executes the instructions. The instructions received by the main memory 1108 may optionally be stored on the storage device 1110, either before or after their execution by the processor(s) 1104.

Each processing unit may also include a communication interface 1114 coupled to the bus 1103. The communication interface 1114 provides two-way communication between the respective user stations 1024 and the host computer 1022. The communication interface 1114 of a respective processing unit transmits and receives electrical, electromagnetic or optical signals that include data streams representing various types of information, including instructions, messages and data.

A communication link 1115 links a respective user station 1024 and a host computer 1022. The communication link 1115 may be a LAN 1025, in which case the communication interface 1114 may be a LAN card. Alternatively, the communication link 1115 may be a PSTN 1028, in which case the communication interface 1114 may be an integrated services digital network (ISDN) card or a modem. Also, as a further alternative, the communication link 1115 may be a wireless network 1030.

A processing unit may transmit and receive messages, data, and instructions, including program, i.e., application, code, through its respective communication link 1115 and communication interface 1114. Received program code may be executed by the respective processor(s) 1104 as it is received, and/or stored in the storage device 1110, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense, and the invention is not to be restricted or limited except in accordance with the following claims and their legal equivalents.

What is claimed is:

1. In a computer system, a computer implemented method of switching a resource consumer from a first resource consumer group to a second resource consumer group, comprising:
   identifying a resource allocation plan, the resource allocation plan specifying the first resource consumer group to which the resource consumer is assigned;
   identifying a switch criterion defining timing circumstances that when met trigger the switching of the resource consumer from the first resource consumer group to the second resource consumer group;
   comparing the switch criterion with current timing circumstances associated with the resource consumer; and
   switching the resource consumer from the first resource consumer group to the second resource consumer group when the current timing circumstances are greater than the switch criterion and the resource consumer is assigned to the second resource group for further execution based on an estimated execution time wherein the switch criterion comprises a maximum estimated execution time for the resource consumer; and
   storing the estimated execution time in a volatile medium or non-volatile medium.

2. The method of claim 1, further comprising switching the resource consumer back to the first resource consumer group when the resource consumer temporarily ceases executing.

3. The method of claim 1, wherein the switch criterion comprises a maximum execution time.

4. The method of claim 1, further comprising identifying the second resource consumer group as resource consumer group to which the resource consumer will be switched.

5. The method of claim 1, wherein the resource consumer is assigned to the first resource consumer group based on a resource requirement.

6. The method of claim 1 comprising:
   identifying one or more other resource consumers, wherein each of said resource consumers are either awake or asleep; and
   allocating resources for each of said resource consumers.

7. The method of claim 1 comprising:
   identifying one or more sub-plans of the plan each comprising one or more other resource consumers, wherein each of said resource consumers are either awake or asleep; and
   allocating resources for each of said resource consumers.

8. The method of claim 1 further comprising:
   identifying a second plan, said second plan specifying the first resource consumer group to which the resource consumer is assigned; and
   switching between said plan and said second plan without interrupting the operation of a computer program implementing an operating system.

9. The computer implemented method of claim 1, wherein the resource allocation plan specifying the first resource consumer group to which the resource consumer is assigned based on whether the resource consumer performs administrative functions or data processing.

10. A computer program product that includes a volatile medium or non-volatile medium useable by a processor, the volatile medium or the non-volatile medium comprising a sequence of instructions which, when executed by said processor, causes said processor to execute a method of switching a resource consumer from a first resource consumer group to a second resource consumer group, the method comprising:
    identifying a resource allocation plan, the resource allocation plan specifying the first resource consumer group to which the resource consumer is assigned;
    identifying a switch criterion defining timing circumstances that when met trigger the switching of the resource consumer from the first resource consumer group to the second resource consumer group;
    comparing the switch criterion with current timing circumstances associated with the resource consumer; and
    switching the resource consumer from the first resource consumer group to the second resource consumer group when the current timing circumstances are greater than the switch criterion and the resource consumer is assigned to the second resource group for further execution based on an estimated execution time wherein the switch criterion comprises a maximum estimated execution time for the resource consumer; and
    storing the estimated execution time in a volatile medium or non-volatile medium.

11. The computer program product of claim 10, further comprising switching the resource consumer back to the first resource consumer group when the resource consumer temporarily ceases executing.

12. The computer program product of claim 10, wherein the switch criterion comprises a maximum execution time.

13. The computer program product of claim 10, the method further comprising identifying the second resource consumer group as resource consumer group to which the resource consumer will be switched.

14. The computer program product of claim 10, wherein the resource consumer is assigned to the first resource consumer group based on a resource requirement.

15. The computer program product of claim 10 further causes said processor to execute a method of switching a resource consumer from the first resource consumer group to the second resource consumer group, the method further comprising:
    identifying one or more resource consumers, wherein said resource consumers are either awake or asleep; and
    allocating resources for each of said resource consumers.

16. The computer program product of claim 10 further causes said processor to execute a method of switching a resource consumer from the first resource consumer group to the second resource consumer group, the method further comprising:
    identifying one or more sub-plans each comprising one or more resource consumers, wherein said resource consumers are either awake or asleep; and
    allocating resources for each of said resource consumers.

17. The computer program product of claim 10 further causes said processor to execute a method of switching a resource consumer from the first resource consumer group to the second resource consumer group, the method further comprising:
    identifying a second plan, said second plan specifying the first resource consumer group to which the resource consumer is assigned; and
    switching between said plan and said second plan without interrupting the operation of a computer program implementing an operating system.

18. The computer program product of claim 10, wherein the resource allocation plan specifying the first resource consumer group to which the resource consumer is assigned based on whether the resource consumer performs administrative functions or data processing.

19. A system having a processor for switching a resource consumer from a first resource consumer group to a second resource consumer group, comprising:

means for identifying a resource allocation plan, the resource allocation plan specifying the first resource consumer group to which the first resource consumer is assigned;

means for identifying a switch criterion defining timing circumstances that when met trigger the switching of the resource consumer from the first resource consumer group to the second resource consumer group;

means for comparing the switch criterion with current timing circumstances associated with the resource consumer; and means for switching the resource consumer from the first resource consumer group to the second resource consumer group when the current timing circumstances are greater than the switch criterion and the resource consumer is assigned to the second resource group for further execution based on an estimated execution time wherein the switch criterion comprises a maximum estimated execution time for the resource consumer; and a volatile medium or a non-volatile medium for storing the estimate execution time.

20. The system of claim 19, further comprising means for switching the resource consumer back to the first resource consumer group when the resource consumer temporarily ceases executing.

21. The system of claim 19, wherein the switch criterion comprises a maximum execution time.

22. The system of claim 19, further comprising means for identifying the second resource consumer group as resource consumer group to which the resource consumer will be switched.

23. The system of claim 19 further comprising:

means for identifying one or more resource consumers, wherein said resource consumers are either awake or asleep; and means for allocating resources for each of said resource consumers.

24. The system of claim 19 further comprising: means for identifying one or more sub-plans each comprising one or more resource consumers, wherein said resource consumers are either awake or asleep and allocating resources for each of said resource consumers.

25. The system of claim 19 further comprising:

means for identifying a second plan, said second plan specifying the first resource consumer group to which the resource consumer is assigned;

means switching between said plan and said second plan without interrupting the operation of a computer program implementing an operating system.

26. The system of claim 19, wherein the resource allocation plan specifying the first resource consumer group to which the resource consumer is assigned based on whether the resource consumer performs administrative functions or data processing.

* * * * *